United States Patent [19]

Mitteldorf et al.

[11] 3,884,679

[45] May 20, 1975

[54] METHOD OF PREPARING A STABLE MIXTURE OF CALCIUM WITH A COMPOUND YIELDING WATER AT ELEVATED TEMPERATURE

[75] Inventors: Rudolf Mitteldorf; Erich Pfluger; Werner Steinicke, all of Trostberg, Germany

[73] Assignee: Suddeutsche Kalkstickstoff-Werke Aktiengesellschaft, Trostberg, Upper Bavaria, Germany

[22] Filed: May 13, 1974

[21] Appl. No.: 469,624

[30] Foreign Application Priority Data

May 24, 1973 Germany............................ 2326539

[52] U.S. Cl. .............................. 75/53; 75/51; 75/55
[51] Int. Cl. ............................................... C21c 7/00
[58] Field of Search .................................. 75/51–57

[56] References Cited
UNITED STATES PATENTS

| | | | |
|---|---|---|---|
| 2,992,097 | 7/1961 | Spence | 75/55 |
| 3,579,325 | 5/1971 | Stone | 75/55 |
| 3,598,573 | 8/1971 | Freissmuth | 75/55 |

*Primary Examiner*—Peter D. Rosenberg
*Attorney, Agent, or Firm*—Hans Berman; Kurt Kelman

[57] ABSTRACT

A stable desulfurizing composition for pig iron containing at least 50% calcium carbide and a compound yielding water for developing acetylene from the carbide at the melting temperature of the pig iron is produced by grinding the calcium carbide and the water-bearing compound, preferably calcium hydroxide or colemanite, at 50° to 250°C in an inert atmosphere to an average grain size of approximately 0.1 mm or less. It may safely be stored in gas-tight containers.

9 Claims, No Drawings

METHOD OF PREPARING A STABLE MIXTURE OF CALCIUM WITH A COMPOUND YIELDING WATER AT ELEVATED TEMPERATURE

This invention relates to desulfurizing compositions for pig iron and other metals, and particularly to a method of preparing a stable desulfurizing composition which contains calcium carbide in intimate mixture with a solid compound capable of yielding water at the melting temperature of the metal to be desulfurized.

Calcium carbide is a known desulfurizing agent for pig iron and other metals. It is also being used for this purpose in combination with a crude mixture of about 70 to 85% calcium carbonate, 8 to 12% carbon, and miscellaneous inert impurities (iron oxide, aluminum oxide, silica) obtained when aqueous suspensions of calcium cyanamide are treated with carbon dioxide in the manufacture of dicyano diamide (German Patent No. 1,758,250). The gas developed by the mixture at the melting temperature of pig iron is thought to account for the observed improvement in the desulfurizing effect of the calcium carbide.

Calcium carbide releases gaseous acetylene in the presence of water, and acetylene improves the desulfurizing effect of calcium carbide as do other gases generated in the molten metal. However, it is not practical separately to add calcium carbide and a compound yielding water at the temperature of the ferrous melt, and mixtures of calcium carbide with suitable, normally solid sources of water such as calcium hydroxide, are not stable when prepared in the usual manner. They steadily produce enough acetylene to make storage and handling dangerous.

It has now been found that mixtures of calcium carbide with a suitable solid source of water can be prepared by mixing the carbide with the solid, water-bearing compound, and grinding the resulting mixture in an atmosphere inert to the calcium carbide and the water-bearing compound at 50°C to 250°C to a preferably pulverulent condition, that is, to an average particle size not greater than 0.1 mm. The term "water-bearing compound" is used for the sake of brevity to designate a compound solid at normal temperature of 20°C which yields water when heated in the presence of calcium carbide to a temperature above 250°C while being stable in air at temperatures below 250°C.

The water may be present in the compound initially as an integral part of the molecule, as crystal water, or as water held by the hygroscopicity of the compound.

Grinding with calcium carbide at elevated temperatures not higher than 250°C has been found to strip the mixture of water loosely held by the water-bearing compound so that the remaining water is too firmly bound to react with the calcium carbide under all reasonable storage conditions, and the mixture is stable as long as it is protected from moisture in the atmosphere and from other external sources of water. Intimate contact between the water-bearing compound and the calcium carbide during grinding is essential for the success of this stabilizing treatment because at least some of the loosely held water is removed by conversion to acetylene, but cannot be removed by mere heating to a comparable temperature for any reasonable period.

If the particles of the starting materials, particularly of the calcium carbide, are fist-sized or bigger, the advantages of the invention can be achieved by grinding to a particle size as coarse as 2 mm, but a pulverulent condition of the ground mixture is safer. Regardless of the large interface of the carbide and the water-bearing material, crystal water and chemically bound water does not react with the calcium carbide during grinding. If atmospheric moisture is excluded, the ground mixture remains stable indefinitely at all temperatures lower than the grinding temperature.

Inexpensive water-bearing compounds which are permissible addition agents for pig iron melts include calcium hydroxide, colemanite, and pandermite. Kaolin and other clays may be employed successfully if dried to remove much of the loosely bound water before the clay is mixed with the carbide. If this precaution is not taken, the ultimate product is still stable, but carbide is decomposed unnecessarily during grinding.

The progress of the grinding operation may be monitored conveniently by determining the rate at which acetylene is developed. If an inert atmosphere is being maintained by continuously feeding an inert gas to the grinding zone and continuously withdrawing a corresponding amount of gas, the change in the acetylene content of the discharged gas is a reliable indication of the need for further grinding a batch of desulfurizing composition. A product stable at all ordinary temperatures is achieved when the acetylene content of the gas discharged at a grinding temperature above 50°C remains constant. To guard against insufficient sensitivity of the testing method employed, grinding is preferably continued for some time after an apparently steady state is reached. To establish the grinding time in a mill to which the components are fed continuously, and from which the desulfurizing composition is withdrawn continuously, the necessary operating time for each set of conditions must be determined by testing the product.

Removing the acetylene formed during grinding has been found beneficial, and this is achieved most conveniently by replacing the inert atmosphere in the grinding zone two times to ten times per hour.

The chemical nature of the inert atmosphere is not critical, and the gas may be chosen according to its cost and availability. Combustion gas from the burner of a steam boiler provides a suitable atmosphere if stripped of water vapor in a conventional manner. Dry nitrogen is often available at a cost low enough to make its use practical, and carbon dioxide has been used successfully. The finished product should be protected by the inert gas while it is being cooled from the grinding temperature to ambient temperature, and while it is being packaged in suitable containers impervious to water vapor.

Other materials conventionally employed in the processing of pig iron may be added to the desulfurizing mixture before or during grinding. Carbon in its various forms (graphite, carbon black, coke, bituminous coal, charcoal) is known to enhance desulfurization, as do substances which release gases other than steam of acetylene, such as carbonates (limestone, dolomite, magnesite) and many organic materials.

The calcium carbide content of the mixture being ground should be at least 50% of the combined weight of calcium carbide and water-bearing compound to provide the required large interface, but a weight ratio between 60:40 and 90:10 is preferred. If only very little steam is needed from the water-bearing compound in the metal melt, a weight ratio as high as 97% carbide to 3% water-bearing compound is operative.

The ground mixtures of calcium carbide and water-bearing compounds are stored, handled, and shipped safely if the precautions customary for calcium carbide are observed. Thinwalled containers which are gastight are therefore adequate. Because they do not need to resist significant internal gas pressure, the containers may be made of rigid material, such as sheet metal or cardboard provided with a plastic liner as is conventional in packaging chemicals if needed to provide a gastight envelope, and plastic bags may be sufficient under some conditions.

The following Examples further illustrate the method of producing the stable desulfurizing compositions of the invention.

EXAMPLE 1

Crude calcium carbide, as it came from the electric furnace, was directly fed to a tube mill together with enough calcium hydroxide to make the weight ratio of the two components 85;15. The calcium carbide contained 76.5% $CaC_2$, had a particle size up to about 50 mm, and entered the tube mill at a temperature of 110°C. The calcium hydroxide was stripped of excess water by drying at 150°C before it was fed to the mill. An inert atmosphere was maintained in the mill by passing dry nitrogen through the mill at a rate of 2.5 $m^3$ nitrogen per $m^3$ of mill capacity per hour.

The total weight of the charge was 5670 kg. It was comminuted in the mill by means of hardened steel balls in 68 minutes to a maximum particle size of approximately 0.1 mm, whereby the temperature of the charge was raised to 163°C. One cubic meter of acetylene corresponding to decomposition of 3.75 kg calcium carbide or 0.07% of the calcium carbide supplied was found in the gas discharged and the gas remaining in the mill at the termination of the grinding process.

The desulfurizing composition discharged from the mill was found to contain 65.0% calcium carbide and 3.5% water available from the calcium hydroxide. Yet, the composition, when stored in sealed sheet-metal containers for two months at an ambient temperature not exceeding 40°C, was found to release only insignificant trace amounts of acetylene.

EXAMPLE 2

The tube mill referred to in Example 1 was charged with a mixture of 4565 kg crude calcium carbide (78.1% $CaC_2$) and 936 kg colemanite having the nominal composition $2CaO.3B_2O_3.5H_2O$, the weight ratio of the components being 83:17. The calcium carbide had a particle size of up to about 50 mm and a temperature of 96°C. The colemanite was pre-dried at 150°C before being fed to the mill.

During the grinding process, which took one hour, the mill was flushed with 3.7 volumes of dry nitrogen based on the volumetric capacity of the mill. The acetylene content of the gas discharged from the mill was initially higher, but quickly dropped to less than 1%.

The total amount of acetylene developed during grinding was 7 $m^3$ corresponding to a decomposition of 25.6 kg calcium carbide or 0.56% of the amount originally supplied.

The mixture discharged from the mill was found to be eminently suitable for desulfurizing pig iron. It contained 64.5% calcium carbide and 3.75% water as crystal water in the colemanite. It was stored several months in sealed plastic bags at the temperature of the ambient atmosphere without developing any detectable acetylene.

EXAMPLE 3

The procedure of Example 1 was repeated except as stated otherwise. The charge initially consisted of 4625 kg crude calcium carbide (76.5% $CaC_2$) and 660 kg calcium hydroxide predried at 150°C. After 20 minutes of grinding, 25 kg coke breeze was added, and grinding was continued for 40 minutes. The acetylene content of the discharged gas reached a maximum of 2.8% 14 minutes after the start of grinding.

The desulfurizing composition discharged from the mill contained 64.9% calcium carbide and 3.1% water bound in calcium hydroxide. It was stable and did not develop any acetylene when stored in sealed containers at ambient temperature for several months.

Analogous results were achieved in continuous grinding in a three-stage tube mill whose first stage contained steel rods 45 to 55 mm long, the second stage contained steel balls of 50 mm and 30 mm diameter, and the third stage contained steel cubes of 34 mm and 36 mm length. The rods, balls, and cubes consisted of alloy steel having a Brinell hardness of 400.

Other grinding equipment may be employed instead of the tube mill referred to above if it provides intimate contact of the calcium carbide particles with those of the water-bearing compound.

While the invention has been described with particular reference to specific embodiments, it is to be understood that it is not limited thereto, but is to be construed broadly and restricted solely by the scope of the appended claims.

What is claimed is:

1. A method of producing a stable desulfurizing composition for molten metal which comprises:
   a. mixing particulate calcium carbide with a compound solid at 20°C,
      said compound yielding water when heated in the presence of calcium carbide to a temperature above 250°C while being stable in air at temperatures below 250°C; and
   b. grinding the resulting mixture at 50°C to 250°C in an atmosphere inert to said calcium carbide and to said compound to a particle size not greater than 2 mm,
      the amount of calcium carbide in said mixture being between 50 and 97% of the combined weight of said calcium carbide and of said compound.

2. A method as set forth in claim 1, wherein the weight ratio of said calcium carbide and of said compound in said mixture is between 60:40 and 90:10.

3. A method as set forth in claim 2, wherein said resulting mixture is ground to an average particle size not greater than 0.1 mm.

4. A method as set forth in claim 3, wherein said mixture is ground together with elementary carbon.

5. A method as set forth in claim 2, wherein said resulting mixture is ground at least until the rate of acetylene development from the ground mixture reaches a constant value.

6. A method as set forth in claim 2, wherein said resulting mixture is ground in a grinding zone, said inert atmosphere being replaced in said zone at a rate of two times to ten times per hour.

7. A method as set forth in claim 2, wherein said compound is calcium hydroxide or colemanite.

8. A method as set forth in claim 1, wherein said mixture is stored in a gas-tight container after said grinding for at least two months.

9. A method as set forth in claim 8, wherein said compound yields water when heated to a temperature between 250°C and the melting temperature of pig iron.

* * * * *